Patented Aug. 17, 1926.

1,596,625

UNITED STATES PATENT OFFICE.

WILLIAM A. ROBINSON, OF SISSETON, SOUTH DAKOTA.

ANTHELMINTIC COMPOSITION.

No Drawing.   Application filed July 3, 1923.   Serial No. 649,373.

This invention has as its object to provide an improved anthelmintic composition which will prove highly efficacious in expelling internal parasites from the human system. It is a well known fact that internal parasites develop organs by which they are enabled to cling to the lining of the intestines of the host and that anthelmintics or vermifuges which are intended to kill the parasites are in practically every instance inefficient or useless in their action. Even if such remedies are effective in their action in exterminating the parasites, it is the general rule that the parasites will remain attached to the intestinal linings causing illness and disorders of the intestinal organs. The present invention therefore has as its object to provide an anthelmintic composition embodying substances which will act coordinately to first cause the parasites to release their hold upon the intestinal linings, and then further act to effect their discharge from the system.

The composition embodying the present invention comprises a mixture of approximately two ounces of an abrasive substance and from 5 to 10 drops of an anesthetic substance, such as carbon tetrachloride. The abrasive employed is preferably pulverized granite. The ingredients are thoroughly mixed, and the mixture is administered in appropriate doses. Upon the administration of the mixture the carbon tetrachloride acts upon the parasites in the manner of an anesthetic, thus influencing the parasites to release their hold upon the intestinal linings. At the same time the pulverized granite acts as an abradant to scour the parasites from the walls of the intestines, and they being anesthetized, are incapable of regaining their hold upon the lining of the intestines and may therefore be readily expelled by the employment of a suitable purgative. Not only does the pulverized granite serve to scour the parasites from the lining of the intestines but it also acts as a gentle abradant to cleanse the lining and restore it to a healthy condition.

From the foregoing it will be evident that the remedial composition embodying the invention is highly efficacious in the removal of parasites from the intestines and, therefore, as parasites are recognized as the cause of pernicious anemia, the composition is of value to the extent that it will remove the cause of this disease.

Having thus described the invention, what is claimed as new is:

1. A composition for removing parasites from the intestines comprising a mixture of an anesthetic for rendering the parasites inert, and an abrasive medium for scouring the inert parasites from the walls of the intestines.

2. A composition for removing parasites from the intestines comprising a mixture of an anesthetic for rendering the parasites inert, and pulverized granite for scouring the inert parasites from the walls of the intestines.

3. A composition for removing parasites from the intestines comprising a mixture of carbon tetrachloride as an anesthetic for rendering the parasites inert, and an abrasive medium for scouring the inert parasites from the walls of the intestines.

4. An anthelmintic composition comprising a mixture of pulverized granite and carbon tetrachloride.

In testimony whereof I affix my signature.

WILLIAM A. ROBINSON. [L.S.]